(No Model.)

J. E. EDWARDS.
BICYCLE CRANK.

No. 595,535. Patented Dec. 14, 1897.

Inventor
John E. Edwards
By Francis M. Wright
His Attorney

Witnesses

UNITED STATES PATENT OFFICE.

JOHN EDWARD EDWARDS, OF MELBOURNE, VICTORIA.

BICYCLE-CRANK.

SPECIFICATION forming part of Letters Patent No. 595,535, dated December 14, 1897.

Application filed September 5, 1896. Serial No. 605,004. (No model.)

*To all whom it may concern:*

Be it known that I, JOHN EDWARD EDWARDS, engineer, a subject of the Queen of Great Britain and Ireland, and a resident of 138 Little Collins Street, Melbourne, in the county of Bourke, Colony of Victoria, have invented a certain new and useful Improved Crank and its Attachments for Cycles, Bicycles, Velocipedes, and Similar Vehicles, of which the following is a specification.

The object of my invention is to provide an improved means of connecting the pedal to the crank of monocycles, bicycles, tricycles, and other similar machines.

Hitherto it has generally been the practice to connect the pedal-axle in a rigid manner to the end of the driving-crank, so that the foot of the rider met with absolutely no cushioning whatever, but with a resistance which was unyielding; but with my invention the pedal-axle so travels at the end of a pivoted swinging link or lever that the foot-pressure applied by the rider on the downstroke is not only conserved by the aid of a spring, but the leverage is also so increased by the automatic radial extension of the swinging pedal that a rapid pace can be easily attained without any undue expenditure of energy.

Figure 1:
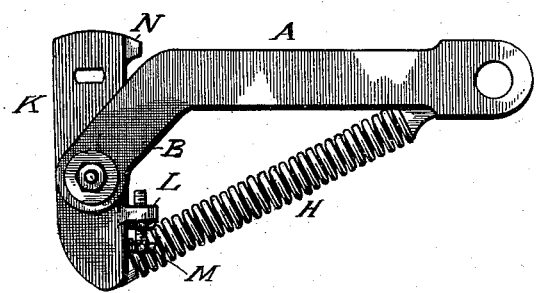
Figure 2:
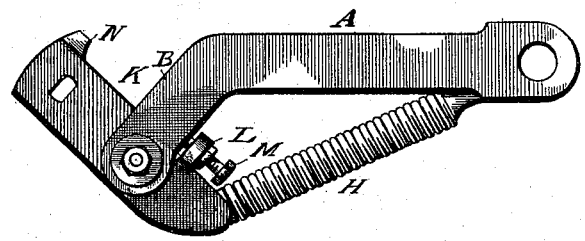
Figure 3:
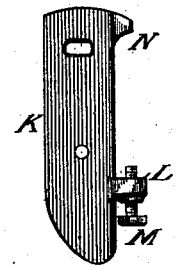

Referring to the drawings which form a part of this specification, Figure 1 is a side elevation of the device with the spring in its normal condition. Fig. 2 is a similar view with the spring compressed, and Fig. 3 is a side elevation of the pedal removed.

A is the crank, having a bent end B, in which is pivoted the lever K, carrying the pedal N at one end of the lever and at the other end the lug L, through which passes an adjustment-screw M, adapted to abut against the bent portion B to form an adjustable stop for the pedal-carrying lever. Upon the end of the lever K opposite to the pedal N is mounted a compression-spring H, connected at the other end with the crank A near its pivot.

In pedaling the rider compresses the spring H, and thus a cushion is furnished to the propelling action. The spring H, being on the opposite side of the lever K to the pedal N, will be well out of the way of the rider.

Having now described my invention, what I claim as new, and desire to secure by Letters Patent, is—

In a crank attachment for cycles, bicycles, &c., the combination of a crank, a pedal-carrier pivoted at the end of the crank, a pedal mounted on the end of said carrier, a spring secured to said carrier and to a point on said crank for throwing the pedal inwardly toward the crank, an arm extending at right angles from said carrier and provided with a screw-threaded aperture, and a set-screw in said aperture arranged to abut against the said crank and adjust the extent of the vibrations of said carrier.

In witness whereof I have hereunto set my hand in presence of two witnesses.

JOHN EDWARD EDWARDS.

Witnesses:
EDWIN PHILLIPS,
CECIL WOODS LE PLASTRIER.